United States Patent [19]

Kohler

[11] Patent Number: 5,253,736
[45] Date of Patent: Oct. 19, 1993

[54] RAILWAY BRAKE ACTUATOR

[75] Inventor: William H. Kohler, Ringwood, N.J.

[73] Assignee: Tec Tran Corporation, Mahwah, N.J.

[21] Appl. No.: 999,015

[22] Filed: Dec. 31, 1992

Related U.S. Application Data

[63] Continuation-in-part of Ser. No. 739,338, Aug. 1, 1991, Pat. No. 5,176,227.

[51] Int. Cl.$^5$ .................................................. B61H 13/00
[52] U.S. Cl. ......................................... 188/59; 92/24; 92/130 A; 188/72.4; 188/71.8; 188/196 P; 188/198; 188/170; 188/72.3; 303/89; 303/71
[58] Field of Search ............... 188/58, 59, 72.4, 72.5, 188/72.6, 153 R, 153 D, 153 A, 265, 67, 198–203, 196 P, 196 R, 216, 106 P, 106 R, 71.8, 72.3, 170; 303/89, 71; 91/41, 44, 43, 45; 92/24, 25, 27; 192/114 R

[56] References Cited

U.S. PATENT DOCUMENTS

| Re. 29,096 | 1/1977 | Jones ........................ 303/100 |
| 1,363,314 | 12/1928 | Cosgrove . |
| 1,754,132 | 4/1930 | Van Bekkum . |
| 2,228,244 | 1/1941 | Baker ............................ 166/1 |
| 2,861,658 | 11/1958 | Bouvat-Martin ............... 188/196 |
| 2,902,256 | 9/1959 | Gustafsson .................... 254/106 |
| 3,172,297 | 3/1965 | Thiene ............................ 74/148 |
| 3,597,016 | 8/1971 | Gachot et al. ............. 188/265 X |
| 3,746,403 | 7/1973 | Jones et al. ...................... 303/89 |
| 3,995,722 | 12/1976 | Jones et al. ................... 188/71.9 |
| 4,058,084 | 11/1977 | Kawaguchi et al. ...... 188/196 P X |
| 4,083,436 | 4/1978 | Straut ............................ 188/265 |
| 4,175,793 | 11/1979 | Clemmons ................ 188/153 R X |
| 4,382,492 | 5/1983 | Ritsema .................... 188/196 P X |
| 4,429,777 | 2/1984 | Taig ............................... 192/111 |
| 4,586,425 | 5/1986 | Redman et al. .................. 92/27 |
| 4,867,283 | 9/1989 | Dill ............................... 188/196 |
| 5,172,958 | 12/1992 | Sell ......................... 188/170 X |
| 5,176,227 | 1/1993 | Kohler ............................ 188/59 |

FOREIGN PATENT DOCUMENTS

| 59778 | 5/1942 | Denmark . |
| 948053 | 7/1949 | France . |
| 666332 | 6/1959 | U.S.S.R. . |

*Primary Examiner*—Douglas C. Butler
*Attorney, Agent, or Firm*—David A. Greenlee

[57] ABSTRACT

A railway brake actuator which provides both service and parking braking comprises a cylinder having an operating cavity. A piston assembly in the operating cavity has a stepped bore forming second and third cavities and is extended by hydraulic pressure and retracted by a spring to apply and release the service brake. Hydraulic pressure extends a hollow parking brake piston from the second cavity to extend the piston assembly and apply the parking brake. A one-way clutch comprising ramps and rollers locks the piston in parking brake applied position. Hydraulic pressure disables the clutch to enable spring retraction of the parking brake piston and the piston assembly to release the parking brake. A gripper ring on the piston assembly operates between cylinder abutments to limit piston assembly retraction to provide slack, and enables slippage on the piston assembly on extension to adjust for brake wear. In another embodiment, a brake actuator has a cylinder housing an inner piston that is extended by springs and is retracted hydraulically. The cylinder houses an outer piston, which is connected to the inner piston through a similar ramp/roller one-way clutch, and mounts a gripper ring. The inner piston extends the outer piston relative to the gripper ring to apply the brake. Another spring retracts the outer piston a distance limited by the gripper ring to provide slack. The clutch disengages the inner piston from the outer piston during retraction to compensate for brake wear.

25 Claims, 12 Drawing Sheets

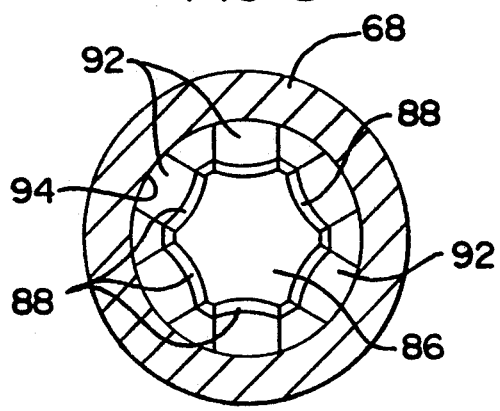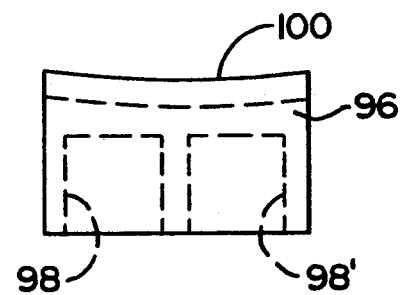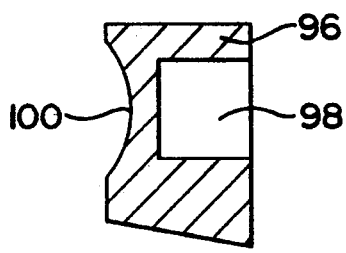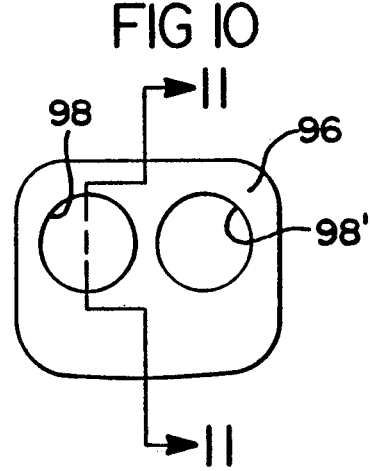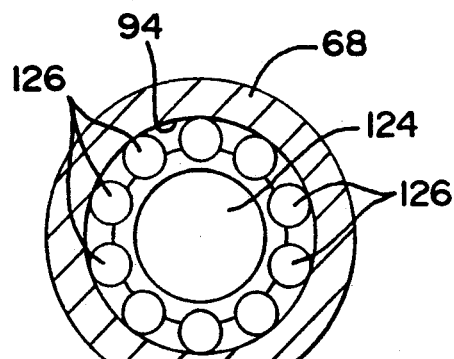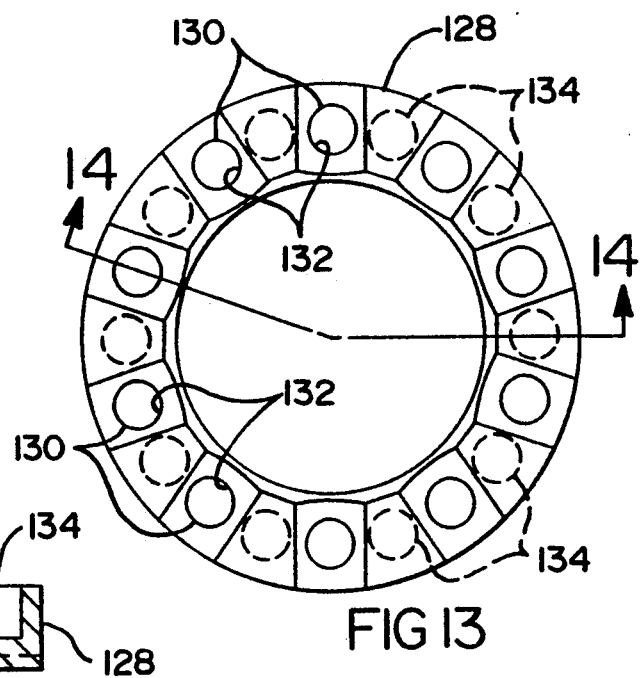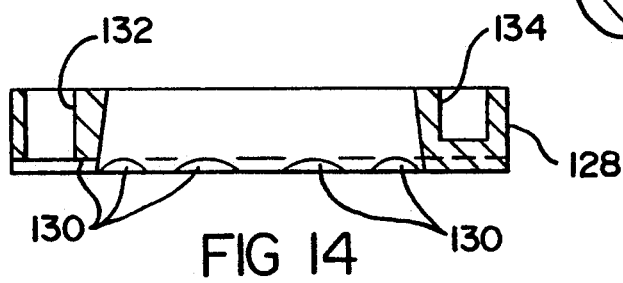

RAILWAY BRAKE ACTUATOR

This is a continuation-in-part of U.S. Ser. No.: 07/739,338, filed Aug. 1, 1991, now U.S. Pat. No. 5,176,227, issued Jan. 5, 1993.

BACKGROUND OF THE INVENTION

This invention relates generally to actuators for railway hydraulic braking systems, to an actuator for applying the service and parking brakes in such systems and, more particularly, to a slack adjuster and a brake wear compensator for such an actuator.

Railway braking systems have traditionally been operated by pneumatic actuators. These air brake systems are still in common use on long distance railways and on many subway systems. Such air brake systems are effective, but lack the ability to modulate braking effort sufficiently to provide consistently smooth stops.

Recently, braking requirements for rapid transit railway cars have resulted in the development of hydraulic friction service braking systems which are controllable to provide the desired smooth stops. Such a hydraulic braking system is disclosed in U.S. Pat. No. 29,096 to Jones. This patent relates a hydraulic friction braking system and a control system of a type currently in use on Washington Metropolitan Area Transit Authority (WMATA) transit cars. This system employs a brake actuator which hydraulically applies and releases the service brakes.

Parking brakes are required to apply and maintain the brakes applied for extended periods when the railway car is out of service and parked. Parking brake actuators have traditionally been mechanically applied and held. A hydraulic parking brake actuator has been developed, for use in the WMATA braking system, as shown in U.S. Pat. No. 4,083,436 to Straut. In this actuator, hydraulic pressure is utilized to extend a piston and apply the parking brake, while a mechanical lock holds the parking brake engaged. This mechanical lock is hydraulically released to enable a spring to retract the piston and release the brake.

In the Straut arrangement, a railway hydraulic actuator assembly includes separate actuators for applying both the service and parking brakes of a railway car. The service brake actuator applies the service brakes by spring force applied through service brake pistons; application of hydraulic pressure fluid, supplied from a pump-fed accumulator, releases the brakes.

A separate actuator applies the parking brake via hydraulic pressure created by a hand pump acting on a separate parking brake piston. The brake is held applied by a mechanical lock comprising a complex friction clutch which locks the piston extended when hydraulic pressure is removed; hydraulic pressure is again utilized to release the friction clutch and to enable the spring force to retract the piston and release the brake.

Although hydraulic railway service and parking brake actuators according to the above patents have been used successfully for many years, they are unduly bulky, complex and expensive to purchase and maintain. Accordingly, it would be desirable to reduce the complexity of railway hydraulic brake actuators.

Further, it would be desirable to provide a parking brake actuator having a mechanical lock of reduced complexity.

In addition, it would be desirable to combine the parking brake and service brake actuators into a single actuator.

Hydraulic railway braking systems have utilized a rotary brake wear compensator in the form of a buttress nut and large lead screw arrangement to automatically compensate for brake wear, such as that illustrated in the Straut patent and in U.S. Pat. No. 3,995,722 to Jones et al. This is a cumbersome and expensive arrangement.

Accordingly, it would be desirable to provide a hydraulic railway service brake actuator having an automatic brake wear compensator of less complexity than the automatic rotary device in current use.

Various forms of slack adjusters have also been used. The Jones patent illustrates the use of a one-way clutch, in the form of a sprag clutch, to provide a predetermined amount of brake wear, while allowing for brake wear adjustment. Unfortunately, these sprag clutches have a failure mode in which the sprags can fail over-center, locking up the brakes. This failure is considered catastrophic in the sense that it prevents the failed brakes from being cut out, thus immobilizing that car and its train.

Accordingly, it would be desirable to provide a slack adjuster that is simpler and does not have a catastrophic failure mode.

SUMMARY OF THE INVENTION

It is therefore an object of this invention to provide a railway brake actuator of reduced complexity.

Another object of this invention is to provide a parking brake actuator having a mechanical lock of reduced complexity. A further object of this invention is to provide a railway brake actuator which combines the parking brake and service brake actuators into a single actuator.

A yet further object of this invention is to provide a hydraulic railway service brake actuator having an automatic brake wear compensator of less complexity than the automatic rotary device in current use.

A still further object of this invention is to provide a slack adjuster that is simpler and does not have a catastrophic failure mode.

In one aspect, this invention features a brake actuator for operating a railway brake, comprising a cylinder having an operating cavity with open and closed ends, and a piston assembly extending through the open end into the cavity. The actuator is connected to the brake such that extension of the piston from the cylinder applies the brake and retraction of the piston within the cylinder releases the brake. A gripper ring carried by the cylinder grips the exterior of the piston assembly with a frictional force to enable movement together. A spring for retracting the ring and piston assembly engages the ring with a retraction force smaller than the frictional force. A first abutment on the cylinder engages the ring upon retraction to limit retracting movement. Power means extends the piston assembly with a force greater than the frictional force to apply the brake and for enabling the spring means to retract the piston assembly to release the brake. A second abutment on the cylinder engages the ring upon extension to limit extending movement of the ring by the hydraulic force while permitting continued movement of the piston assembly to apply the brake. The limited retracting movement of the ring provides brake slack, while movement of the piston assembly relative to the ring upon extension compensates for brake wear.

Preferably, the wear compensator comprises a one-way clutch which enables the piston to freely extend, but which limits piston retraction, and includes means for disabling the one-way clutch to enable the piston to freely retract.

In a preferred embodiment, the one-way clutch comprises a tapered ramp carried by one of the output members, a rotary locking member wedged between the a surface of the other output member and the ramp, and second spring means biasing the rotary member into wedged position to prevent retraction of the piston relative to the ramp but permit its extension relative thereto, the disabling means being operable to move the rotary member out of wedged position to enable the piston to freely retract relative to the ramp.

Preferably, a plurality of ramps are carried by the one output member in circumferentially spaced relation, a rotary locking member in the form of a roller is located between the surface of the other output member and each ramp, the second spring means is operative to bias each roller into wedged position, and the unlocking member is operable to simultaneously move all of the rollers out of wedged position. In another aspect, this invention features a brake actuator for operating a railway brake which comprises a cylinder having an operating cavity with open and closed ends, a piston assembly extending through the open end into the cavity, and means connecting the actuator to the brake such that extension of the piston assembly from the cylinder applies the brake and retraction of the piston assembly within the cylinder releases the brake. A gripper ring is carried by the cylinder and grips the exterior of the piston assembly with a frictional force to enable movement therewith. Spring means exert a retracting force on the ring and piston assembly which is smaller than the friction force. A first abutment on the cylinder limits retraction of the ring and piston assembly by the spring means. Power means are provided for extending the piston assembly with a force greater than the friction force and greater than the retracting force to apply the brake and for enabling the spring means to retract the piston assembly to release the brake. A second abutment on the cylinder limits extension of the ring upon extension of the piston assembly and ring by the hydraulic force, while permitting continued movement of the piston assembly relative to the ring to apply the brake. The limited retraction of the ring provides brake slack, and movement of the piston assembly relative to the ring upon extension compensates for brake wear.

Preferably, the cavity includes a third portion defined by spaced front and rear walls, and the inner piston includes a flange slidable between the walls, the second spring means biasing the inner piston toward the forward wall to extend the inner piston, and the hydraulic means including a source of pressure fluid selectively connectable to the third chamber portion between the forward wall and the flange and operable to overcome the second spring means to retract the inner piston.

In yet another aspect, this invention features a brake actuator for operating a railway brake which comprises a cylinder having a stepped operating cavity with open and closed ends, a piston assembly extending through the open end into the cavity, and means connecting the actuator to the brake such that extension of the piston assembly from the cylinder applies the brake and retraction of the piston assembly within the cylinder releases the brake. The piston assembly comprises an outer piston slidable within one portion of the cavity, an inner piston slidable within another portion of the cavity, and a one-way clutch interconnecting the inner and outer pistons so that the outer piston extends with the inner piston, while enabling the inner piston to retract relative to the outer piston to compensate for brake wear. Power means extend and retract the inner piston to apply and release the brake, and spring means retract the outer piston.

Preferably, the power means comprise second spring means for extending the inner piston and hydraulic means for retracting the inner piston, a gripper ring carried by the cylinder and gripping the exterior of the outer piston with a frictional force to enable movement therewith, third spring means for exerting a retracting force on the ring and outer piston which is smaller than the friction force, a first abutment on the cylinder limiting retraction of the ring and outer piston by the third spring means, the second spring means being operable to extend the inner and outer pistons with a force greater than the friction force to apply the brake, a second abutment on the cylinder limiting extension of the ring upon extension of the outer piston and ring, while permitting continued movement of the outer piston relative to the ring to apply the brake, whereby the limited retraction of the ring provides brake slack, and movement of the inner piston relative to the outer piston upon retraction compensates for brake wear.

These and further objects and features of this invention will become more readily apparent upon reference to the following detailed description of a preferred embodiment, as illustrated in the accompanying drawings, in which:

BRIEF DESCRIPTION OF THE DRAWINGS

FIG. 8 is a sectional view taken along line 8—8 of FIG. 2, illustrating a ramp roller type of one-way clutch utilized to mechanically lock the parking brake in applied position;

FIG. 9 is an enlarged plan view of a retainer for the rollers shown in FIG. 8;

FIG. 10 is a front view of the retainer of FIG. 9;

FIG. 11 is a sectional view taken along line 11—11 in FIG. 10;

FIG. 12 is a view similar to FIG. 8, but illustrating an alternative embodiment which utilizes balls instead of rollers;

FIG. 13 is an enlarged view of a retainer for the balls shown in FIG. 12;

FIG. 14 is a sectional view taken along the line 14—14 of FIG. 13.

DETAILED DESCRIPTION OF A PREFERRED EMBODIMENT

Figure 1:
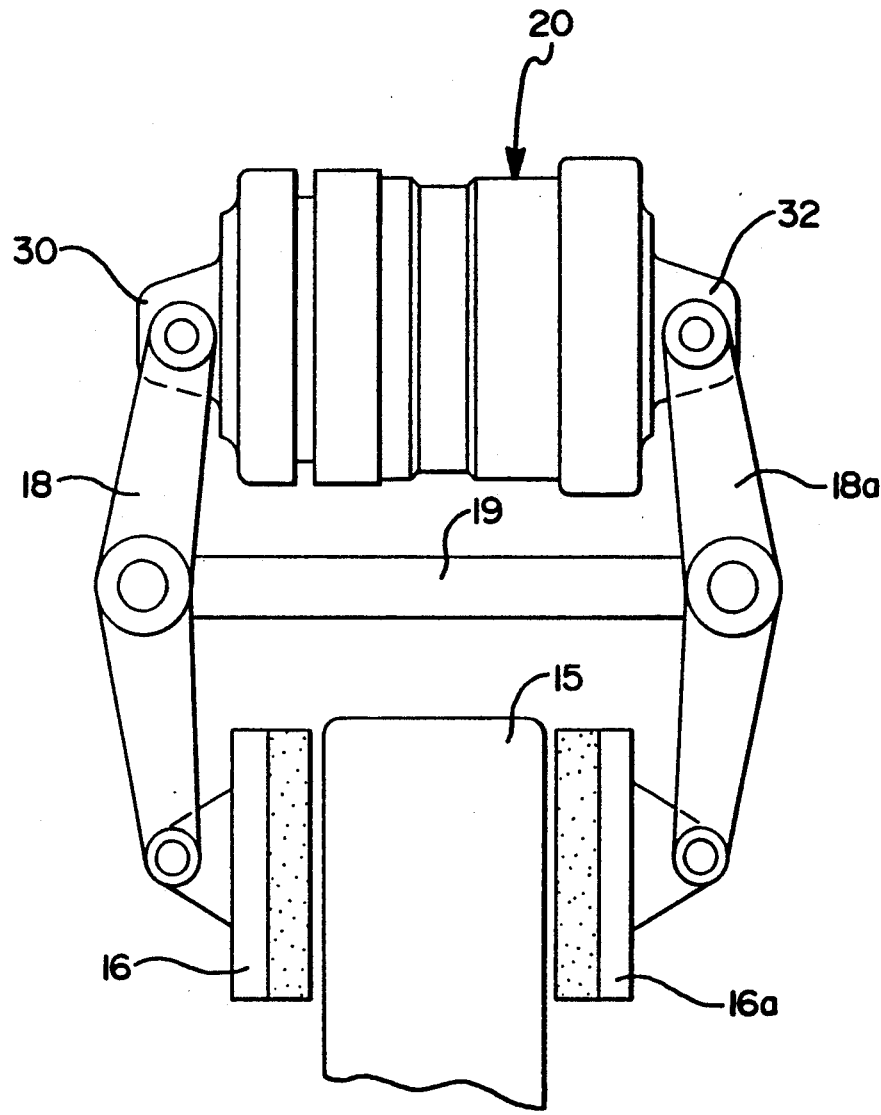
FIG. 1 is a schematicized general arrangement view of a railway friction disc braking system employing a hydraulic service and parking brake actuator according to this invention.

Referring now to FIG. 1 of the drawings, a friction disc braking system for a railway car (not shown) includes a disc 15 conventionally mounted on a wheel (not shown). A pair of friction material brake pads 16, 16a are mounted on opposite sides of disc 15. A pair of operating arms, or links, 18, 18a are pivotally mounted on an interconnecting reaction link 19 and connect pads 16, 16a to a railway brake actuator 20, according to this invention.

Figure 2:
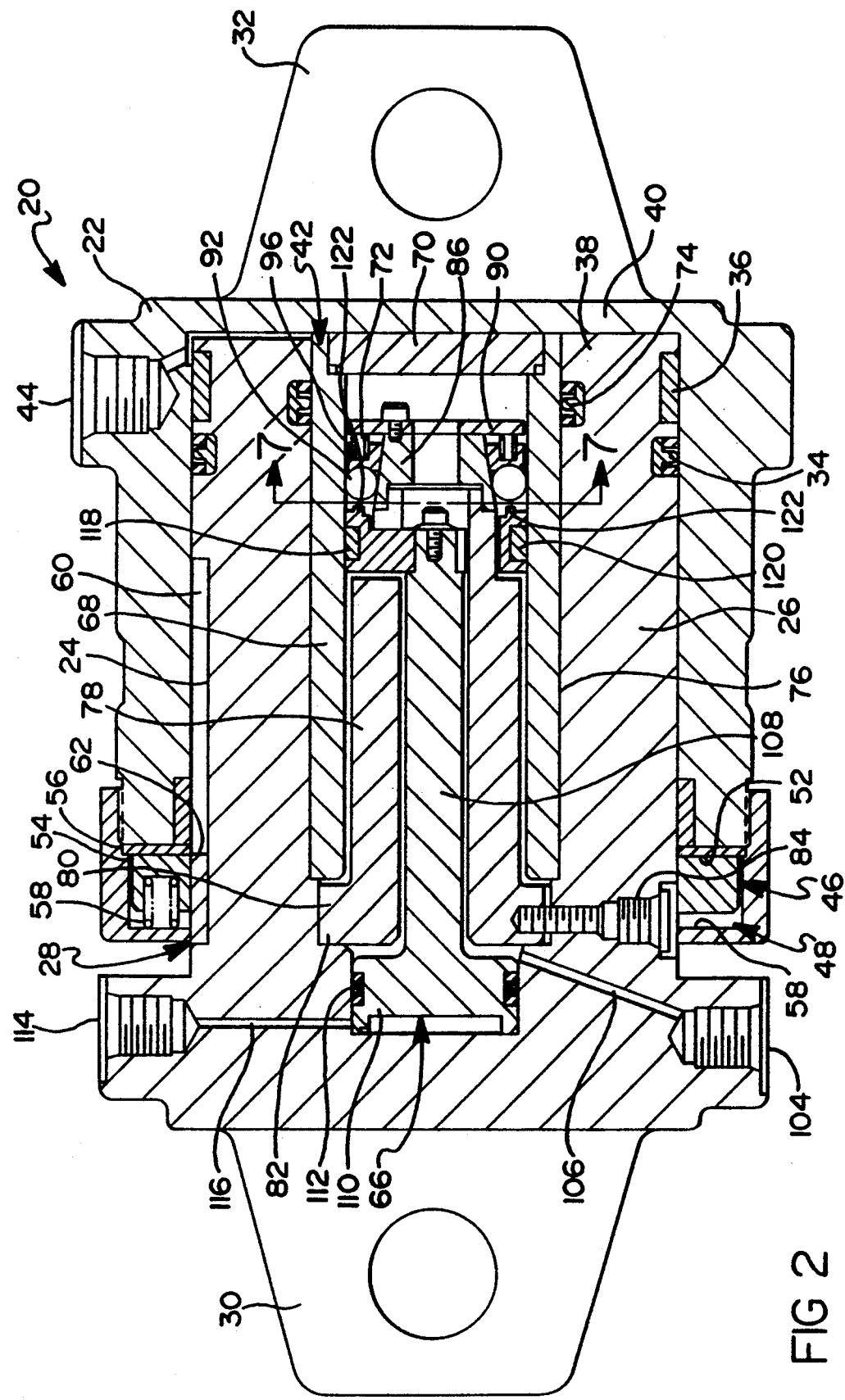
FIG. 2 is an axial sectional view of the brake actuator shown in FIG. 1, illustrated in the brake-released position unadjusted for worn brake friction material.

Referring additionally to FIG. 2, actuator 20 comprises a housing, or cylinder, 22 which forms a first output member and has a cylindrical operating cavity, or bore 24. A cylindrical piston assembly 26 forms a second output member and extends through the open end 28 of bore 24 and includes an aperture mounting ear 30 for attachment to operating link 18. Similarly, cylinder 22 includes a mounting ear 32 for attachment to operating link 18a.

Upon extension of piston assembly 26 from cylinder bore 24, operating links 18, 18a will pivot on reaction link 19 to squeeze disc 15 between pads 16, 16a and apply the brakes. Conversely, retraction of piston assembly 26 within cylinder 22 will release the brakes. This general arrangement is conventional.

The cylinder and piston assembly can be of steel or aluminum, depending on weight requirements. Actuator 20 incorporates a service brake actuator and a parking brake actuator in a single unit. Structure necessary to service brake operation will now be described. Piston assembly 26 is sealed within cylinder bore 24 by an annular pressure seal 34. A wear ring 36 is provided at the inner end 38 of piston assembly 26. This enables piston assembly inner end 38 and cylinder end wall 40 to form a sealed operating chamber 42.

A hydraulic port 44 is formed in cylinder 22 for alternate connection of operating chamber 42 to a source of pressurized hydraulic fluid and to a drain (neither shown) in a well-known manner. Such a source normally comprises a pump-fed pressure accumulator. Pressure fluid in operating chamber 42 comprises power means which act on inner end 38 with a predetermined force to extend piston assembly 26. A hydraulic pressure of 350–450 p.s.i. is conventional; with an effective area of the end of the piston assembly of 10 sq. in., the extension force will be 3500–4500 pounds. A cap 46 is threaded onto the open end of cylinder 22 and includes an annular groove 48 located peripherally about bore 24. Groove 48 is defined by an integral outer abutment wall 50 and a confined annular ring forming an axially-spaced inner abutment wall 52. Groove 48 confines a gripper ring 54 which encircles and grips the periphery of piston assembly 26 with a predetermined friction force. An exemplary gripper friction force is 80 pounds. Thus, the ring and piston assembly normally move together as a unit.

Gripper ring 54 includes twelve circumferentially-spaced axial pockets 56 which each confine a compression spring 58 between ring 54 and groove outer wall 50. Springs 58 comprise first spring means which exert an axial retraction force on gripper ring 54 and piston assembly 26 that is smaller than the friction force by which ring 54 grips piston assembly 26. The spring retraction force (60 pounds, for example) is also smaller than the hydraulic extension force.

The manner and means of providing and controlling hydraulic pressure fluid for the purpose of applying and releasing service brakes is well-known and forms no part of this invention. Operation of service brake actuation will now be described in reference to FIGS. 2 and 3.

The brakes are applied by connecting port 44 to a hydraulic pressure fluid source to pressurize operating chamber 42 and extend piston assembly 26. As piston assembly 26 extends, the brake is applied and springs 58 are compressed until the FIG. 2 position is reached, where ring 54 is shown abutting groove wall 50. This abutment does not limit travel of piston assembly 26, as will be later described in reference to wear compensation. Since the force of compressing springs 58 is less then the friction force of gripper ring 54, the ring and piston assembly move as a unit.

To release the brake, port 44 is connected to drain to remove pressure in chamber 42. This enables springs 58 to retract ring 54 and piston assembly 26 until ring 54 abuts groove wall 52, as illustrated in FIG. 2. The friction force of ring 54 maintains piston assembly 26 in this position. The distance traveled by ring 54 and piston assembly 26 during retraction is the amount of brake slack. Brake slack equals the amount by which the axial distance between walls 50 and 52 exceeds the axial thickness of gripper ring 54 and can be varied by changing the axial width of annular groove 48 or changing gripper ring 54.

Figure 3:
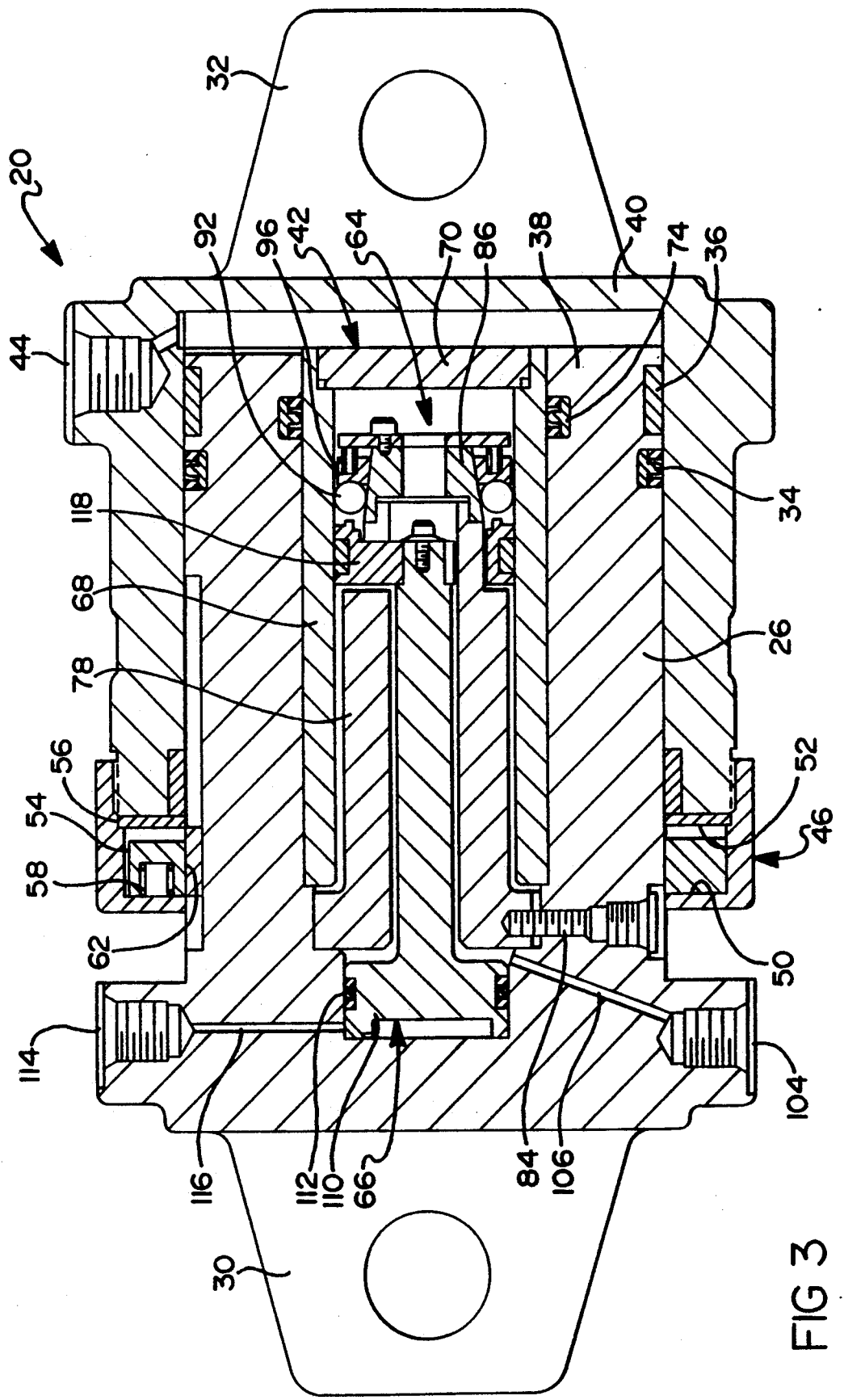
FIG. 3 is a view similar to FIG. 2, but with the brake actuator illustrated in the service brake applied position.

The sequence of operation of the service brake just described in reference to FIGS. 2 and 3 is illustrative of operation with brakes having new, unworn friction material. Operation under conditions of friction material wear will now be described with added reference to FIGS. 4 and 5.

Figure 4:
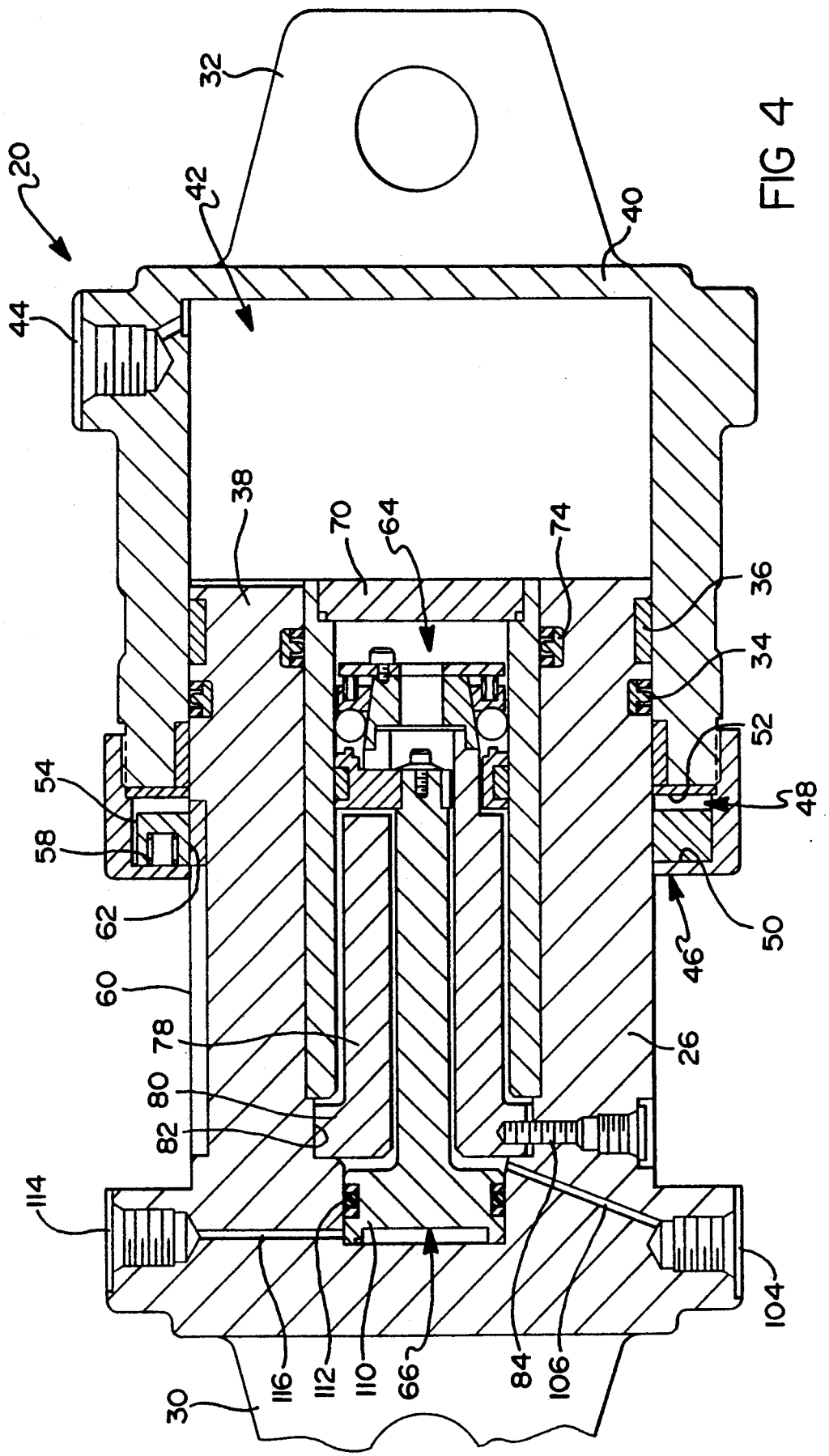
FIG. 4 is a view similar to FIG. 3, with the brake actuator, but illustrated in the service brake applied position as automatically adjusted for worn brake friction material.

As the friction material in the brakes wears, piston assembly 26 must extend further from cylinder 22 to apply the brakes. FIG. 4 illustrates the extension of piston assembly 26 needed to apply the brakes. In an exaggerated illustrative example, application of the service brake from a FIG. 2 position where it has worn friction material is accomplished as follows. Connection of port 44 to a pressure fluid source will pressurize chamber 42 and extend piston assembly 26 and ring 54 initially to the FIG. 3 position, where ring 54 will abut outer groove wall 50. Since the hydraulic extension force is greater than the friction force exerted by gripper ring 54, the ring will stop, while the piston assembly will slide on the ring and continue to extend until the brakes are applied, as illustrated in FIG. 4.

When the brakes are to be released, port 44 is connected to drain. Pressure in chamber 42 will drop to zero and springs 58 will retract ring 54 into abutment with wall 52. The friction force of gripper ring 54 will stop piston assembly 26 from retracting further. Thus piston assembly 26, due to its attachment to ring 54, will automatically retract the same distance, regardless of the degree of wear of the friction material. This provides a uniform amount of slack for the service brake throughout the life of the friction material through automatic wear adjustment.

As a safety measure, piston assembly 26 includes an axial keyway 60 which receives a key 62 mounted on cylinder 22. Key 62 serves as a stop limiting axial extension of piston assembly 26 to prevent accidental separation of actuator 20 should chamber 42 be pressurized in the absence of friction material pads or shoes.

Structure necessary to parking brake actuation will now be described in reference to FIGS. 5 through 14. Piston assembly 26 includes a stepped bore comprising a second operating chamber 64 (see FIGS. 6 and 7) and a smaller third operating chamber 66. A cylindrical parking brake piston 68 is received in chamber 66 and includes a threaded end closure plate 70 that confines a sealing O-ring 72.

Piston assembly 26 carries an inner annular pressure seal 74 that engages the outer surface 76 of piston 68 to enable pressurization of the second operating chamber 64. A cylindrical carrier member 78 has an annular base flange 80 that is received in an annular land 82 interconnecting the second and third operating chambers 64 and 66. Carrier member 78 is secured to piston assembly 26 by a screw 84.

At its outer end, carrier member 78 mounts a ramp sleeve 86. As shown in FIG. 8, six annularly-spaced ramps 88 are formed in the surface of sleeve 86. A reaction ring 90 is bolted to the outer end of ramp sleeve 86. Locking rollers 92 are confined between the ramps 88 and the inner surface 94 of piston 68 and are contoured to match its curvature. The ramps are similarly contoured and have a wedge angle of 7°-8°.

As shown in FIGS. 9-11, each roller is provided with a retainer 96 made of low friction plastic which includes a pair of spring pockets 98, 98'. The front surface 100 of each retainer is contoured to match the roller contour. As shown in FIGS. 2-6, compression springs 102 mount in the pockets 98, 98' and react against reaction ring 90 to wedge rollers 92 between ramps 88 and piston inner surface 94.

This arrangement 78-102 comprises a one-way, or overrunning, clutch in which rollers 92 prevent piston 68 from retracting within piston assembly, but freely permit its extension. A second hydraulic port 104 in piston assembly 26 is provided for supplying pressure fluid to the second operating chamber 64 via drilled passage 106. The source of pressure fluid is preferably as disclosed in the aforementioned Straut patent, where a hand pump is utilized to provide fluid at up to 4900 p.s.i. to chamber 64 to extend piston 68.

An unlocking member 108 includes an enlarged piston 110 that is received within the third operating chamber 66. Peripheral O-rings 112 provide a pressure seal for chamber 66, which is connected to a third hydraulic port 114 by a drilled passage 116. Chamber 66 may be pressurized from the hand pump, as fully explained in the Straut patent, to extend unlocking member 108 from chamber 66.

Unlocking member 108 extends through the center of carrier member 78, but is not attached to it. A roller actuator 118 is bolted to the outer end of unlocking member 108 and mounts an annular wear ring 120 that engages piston inner surface 94. Roller actuator 118 includes six circumferentially spaced fingers 122, each opposite to one of the six rollers 92. Upon pressurization of chamber 66, unlocking member 108 extends relative to carrier member 78 so that fingers 122 engage and move rollers 92 out of wedging position, as will later be described.

Figure 5:
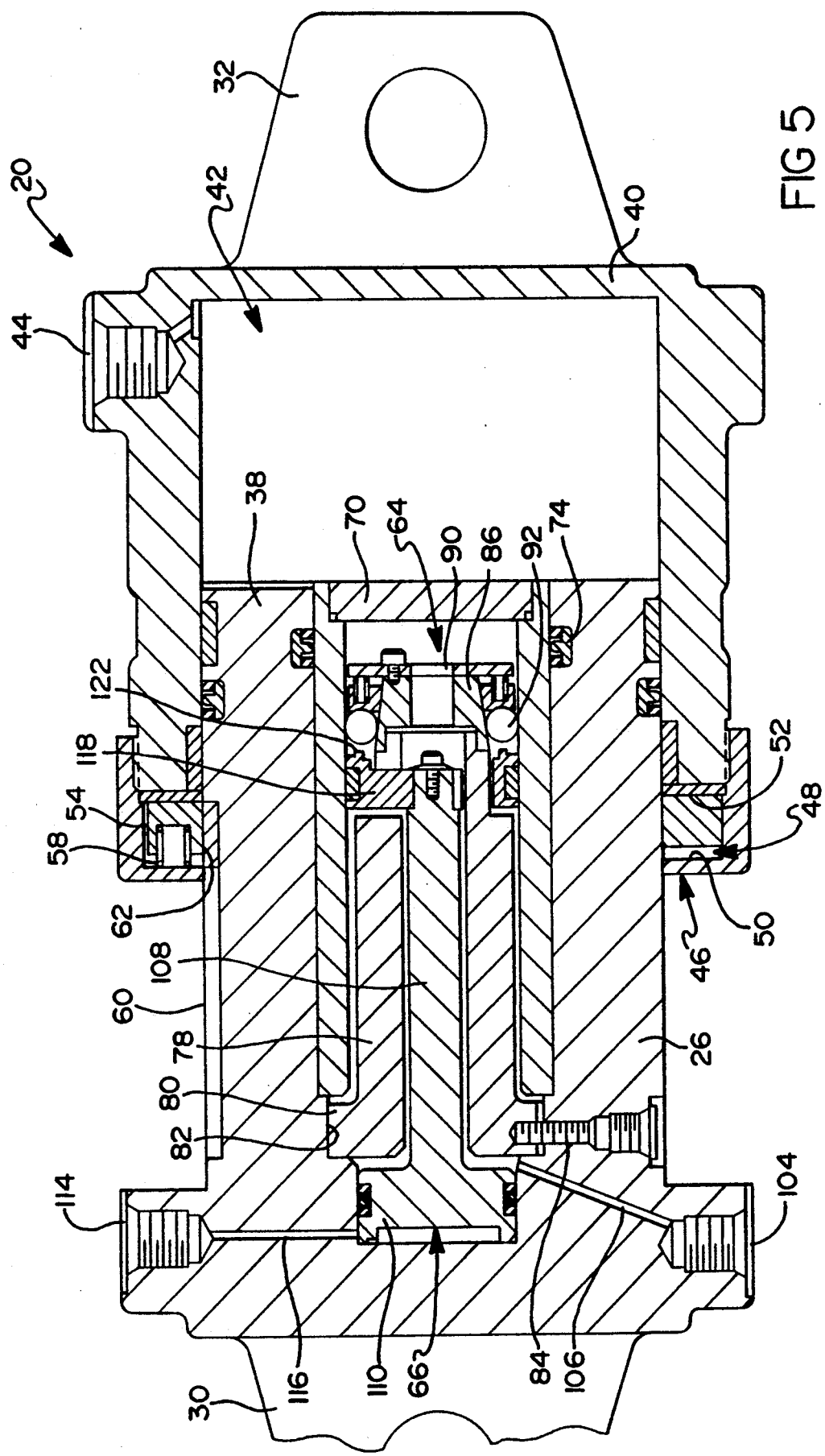
FIG. 5 is a view similar to FIG. 4, but with the brake actuator illustrated in the brake released position as automatically adjusted for worn brake friction material.
Figure 6:
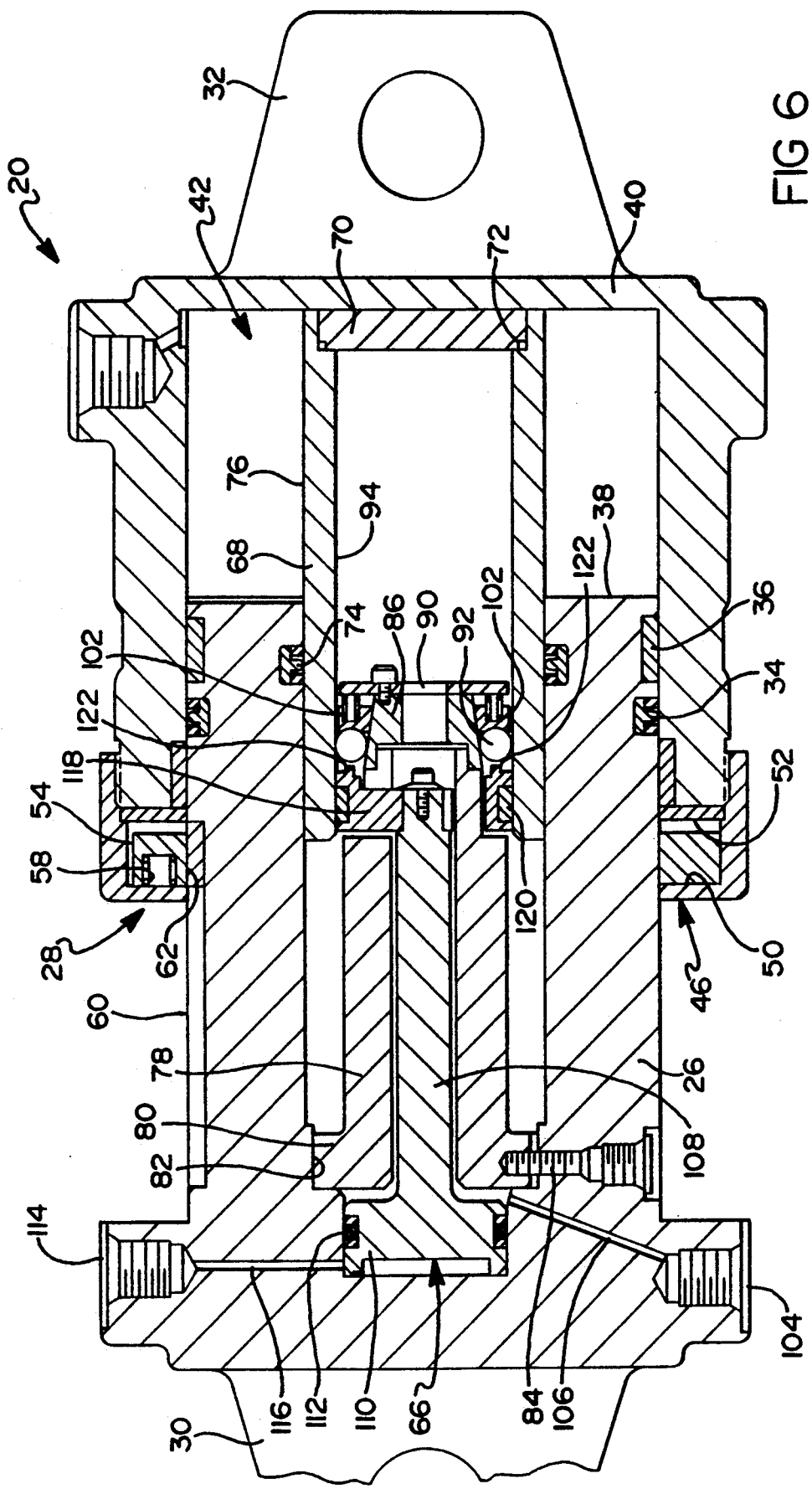
FIG. 6 is a view similar to FIG. 4, but illustrated in the parking brake applied position as automatically adjusted for worn brake friction material.
Figure 7:
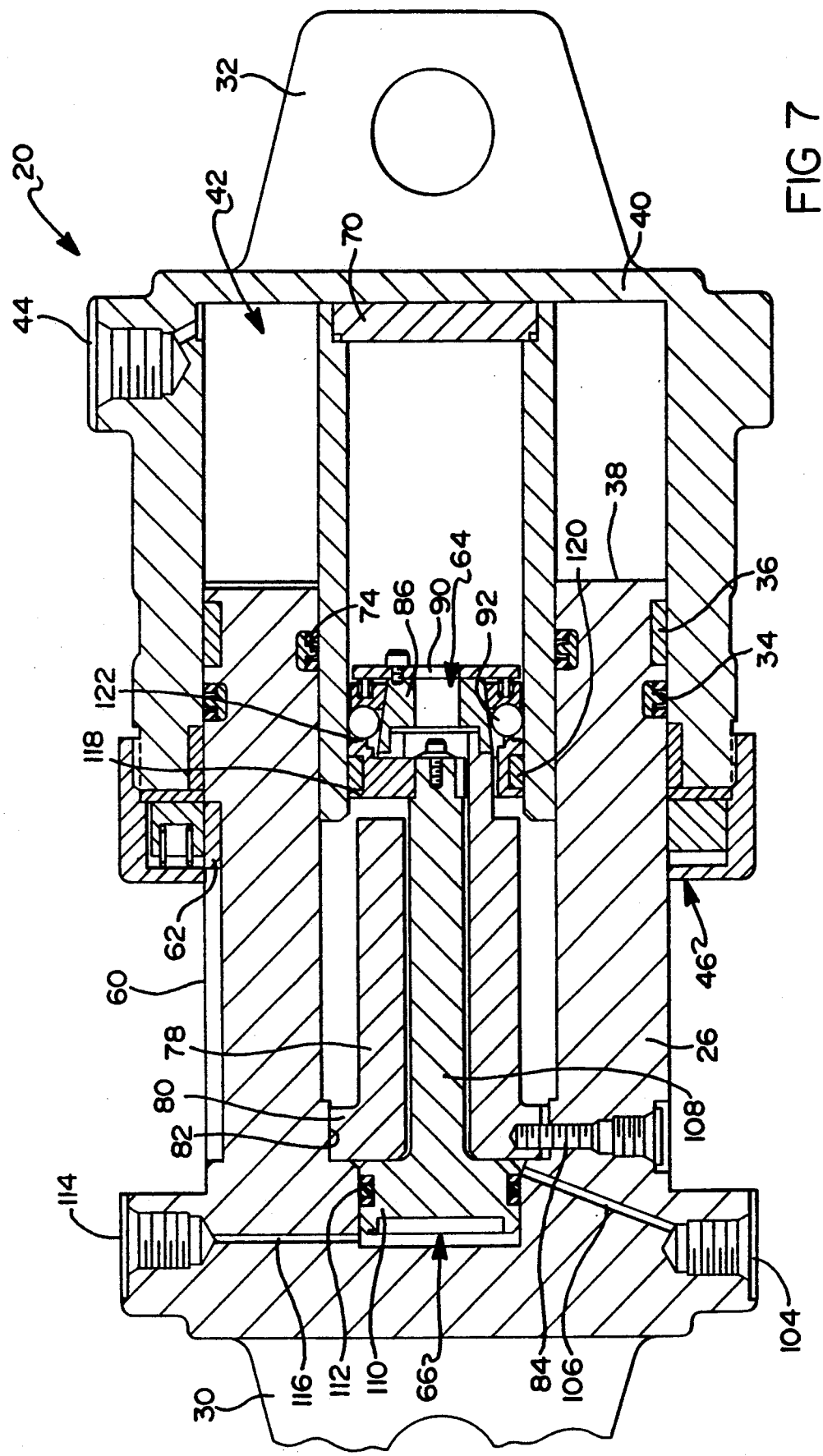
FIG. 7 is a view similar to FIG. 6, but with the brake actuator illustrated in the parking brake released position as automatically adjusted for brake friction material wear.

Operation of the parking brake actuator will now be described with reference to FIGS. 5, 6 and 7. Although the illustrated example assumes well-worn friction material, operation is the same with all degrees of friction material wear. Port 104 is connected for pressurization of chamber 64 (preferably in the manner disclosed in the Straut patent) to extend piston 68 from piston assembly 26, as permitted by clutch 78-102, until end plate 70 engages end wall 40. Piston 68 then reacts against end wall 40 to extend piston assembly 26 and apply the brake, as illustrated in FIG. 6. As with service brake operation, any wear in the friction material will be compensated for by movement of piston assembly 26 relative to cylinder 22, as described above.

When a pressure rise indicates that the brake is fully applied, pressure is removed from chamber 64. Since chamber 66 was unpressurized, pressure in chamber 64 has acted to keep piston 110 retracted to hold fingers 122 away from rollers 92. The parking brake is held set by the wedging action of rollers 92, which is assured by springs 102. This prevents any retraction of piston 68.

To release the parking brake, port 114 is connected to pressurize chamber 66. With chamber 64 now unpressurized, piston 110 will overcome the force of springs 102 and extend roller actuator 118 so that fingers 122 unseat rollers, as illustrated in FIG. 7. Since chamber 64 is unpressurized, and if chamber 42 is also unpressurized (service brake pressure off), return springs 58 will force piston 68 within piston assembly 26 while retracting it to create slack.

However, if, as is a normal practice, the service brake is applied during parking brake release, chamber 42 will be pressurized. This will prevent return springs 58 from retracting piston assembly 26; however, pressure in chamber 42 will force piston 68 to retract within piston assembly 26, since rollers 92 are unseated (as in FIG. 6) and there is no opposing pressure in chamber 64. Upon subsequent release of the service brake by depressurizing chamber 42, release springs 58 will return piston assembly 26 to the position illustrated in FIG. 5.

As a modification, if it is desired to always retract the parking brake piston 68 within piston assembly 26 upon parking brake release, a light spring, such as a Belleville spring, can be confined in the third operating chamber 66. Such a spring would maintain a constant bias on an unlocking member tending to unseat balls 92.

Thus, upon depressurization of chamber 66 to release the parking brake, with no service brake pressure in chamber 42, such a spring would maintain the rollers unseated. Upon the next service brake application, pressure in chamber 42 would force piston 68 within piston assembly 26. Such a spring would be too weak to overcome the tremendous forces exerted by the brake rigging tending to retract actuator 20, which would apply substantial frictional forces to rollers 92 far in excess of the light spring force.

An alternative embodiment of the one-way clutch 72-102 is shown in FIGS. 12, 13 and 14. In this embodiment ramp sleeve 86 is replaced by a cone sleeve 124 having a conical surface incorporating the wedge angle of 7°-8°. Ten circumferentially-spaced balls 126 replace the rollers 92 and are confined between the piston inner surface 94 and the cone sleeve 124.

The front of a ball-retaining cage 128 contains ten depressions or dimples 130 for the balls 126. The reverse side of cage 28 contains ten spaced through-drilled spring pockets 132 which open into the depressions 130. Ten blind spring pockets 134 are formed on the reverse side intermediate pockets 132. Compression springs are confined within pockets 132 and react against each of the balls 126 individually. Springs are also confined within pockets 134 to react against reaction ring 90 as a unit.

The spring action serves to maintain balls wedged between piston surface 94 and the surface of cone sleeve 124. The springs in pockets 132 assure that each ball is biased into wedging position despite any structural irregularity or wear which would prevent cage from operating all balls together as a unit. This embodiment functions as a one-way clutch to lock piston 68 in the same manner as described above in reference to the embodiment shown in FIGS. 8-11.

Another embodiment of this invention is illustrated in FIGS. 15, 16, 17 and 18, in which another railway brake actuator 220 is provided for operating a railway disc brake (not shown) much like that shown in FIG. 1. Actuator 220 comprises a first output member in the form of a housing 221 which comprises a first cylinder 222, having an outer cavity or bore 224, and a second cylinder 226, having a cavity or bore 228. Housing 221 is connected to one of the disc brake operating links, not shown, via radially opposed mounting bores 229. Cylinders 222 and 226 are rigidly secured together by any conventional means, such as bolts, not shown.

Cylinder 222 houses a piston 230 having an outer flange 232 slidable in bore 224, a radial end wall 234 and a cylindrical nose 236 which is slidable in an inner bore 238 formed in the inner end wall 239 of cylinder 222 which connects to the interior of bore 228. Cylinder 222 is closed by an end plate comprising an outer plate 240 and an inner apertured plate 242 which journals a cutout shaft 244. A plurality of Belleville spring washers 246 is confined between inner end plate 242 and wall 234, biasing piston 230 inwardly of bore 224 toward end wall 239. The annular chamber between piston end wall 234 and cylinder end wall 239 comprises a chamber 247 which is selectively connectable to a source of hydraulic pressure fluid, neither shown, to retract piston 230 against the force of spring washers 246 into contact with end plate 240.

A piston assembly 250 comprises a piston 251 having a cylindrical outer wall 252 which is slidable within bore 228 and a radial end wall 254 which is mounted on a second output member 256 connected to the other brake operating link, not shown, via radially opposed mounting bores. Bore 228 is closed by piston assembly 250 and an annular seal ring 260. An annular groove 262 is formed adjacent seal ring 260 in cylinder 226 and houses an annular gripper ring 264 which grips the periphery of piston wall 252 with a force of, e.g. 80 pounds. Gripper ring 264 is biased inwardly against abutment 266 of groove 262 by a plurality of annularly spaced compression springs 268 which react against seal ring 260. Abutment 266 and seal ring 260 limit the inward and outward movement of gripper ring 264.

Piston assembly includes a wear adjustment mechanism, or one-way clutch 270 which includes a carrier member 272 that is secured to piston nose 236, thus securing piston assembly 250 for movement with piston 230. Carrier member also journals and axially confines cutout shaft 244, which includes a radial cam pin 274. At its inner end, cutout shaft 244 carries a cap 276 which mounts a spring reaction plate 278 and a ramp member 280, which is similar in configuration to ramp sleeve 86 in FIGS. 8-11.

A plurality of annularly-spaced ramps 282 are formed in the surface of ramp member 280. Locking rollers 284 are confined between ramps 282 and the inner surface 286 of piston assembly outer wall 252 and are contoured to match its curvature. Although balls could be used, as noted above, rollers are preferred because of their line contact with the wedging surfaces. The ramps are similarly contoured and preferably have a wedge angle of 7°-8°. Each roller is provided with a low friction plastic retainer 288 which include spring pockets 290 that confine compression springs 292 which react against reaction plate 278 to wedge rollers 284 between ramps 282 and inner surface 286. This provides a one-way clutch which allows piston 251 to freely move outwardly relative to ramp member 280 (and, thus, piston 230), or extend from cylinder 226 of actuator 220, but limit its retraction or inward movement.

A cutout member or spider 296 is journaled on shaft 244 and includes a plurality of radial arms 298 and a pair of cam ramps 300 which receive the ends of cam pin 274. Each arm 298 includes a finger 302 adjacent each of the rollers 284. A compression spring 304 is confined between cap 276 and spider ramps 300 to bias spider 296 into engagement with pin 274, with fingers 302 spaced from rollers 284. Rotation of shaft 244 will force the ends of pin 274 up ramps 300 to move spider 296 axially against the force of spring 304. This will engage fingers 302 with rollers 284 which will unseat against the force of springs 292 and disconnect piston 251 from piston 230.

Figure 15:
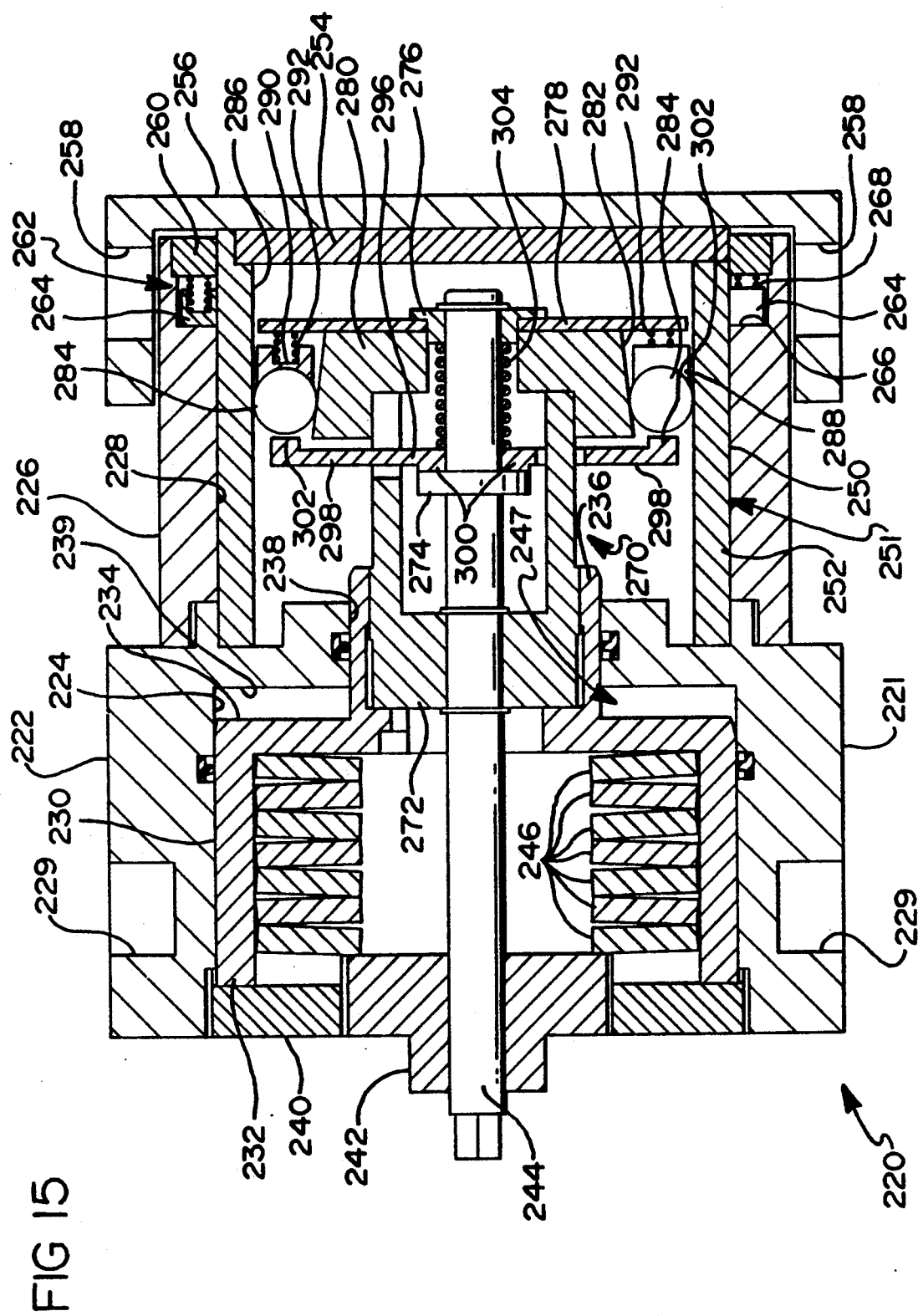
FIG. 15 is a longitudinal sectional view of another embodiment of a railway brake actuator, according to this invention, illustrated in brake released position.
Figure 16:
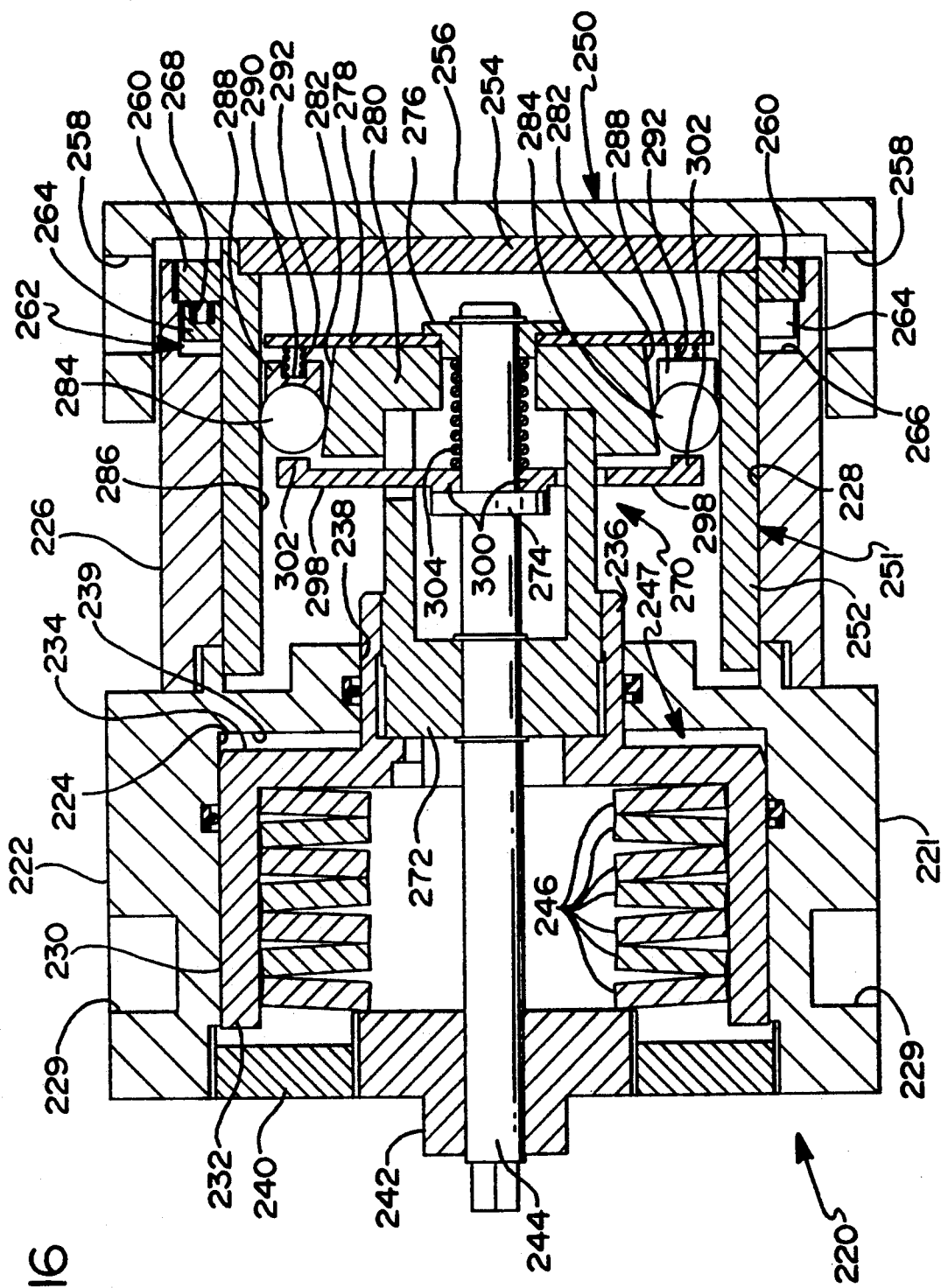
FIG. 16 is a view similar to FIG. 15, but with the actuator illustrated in brake applied position.
Figure 17:
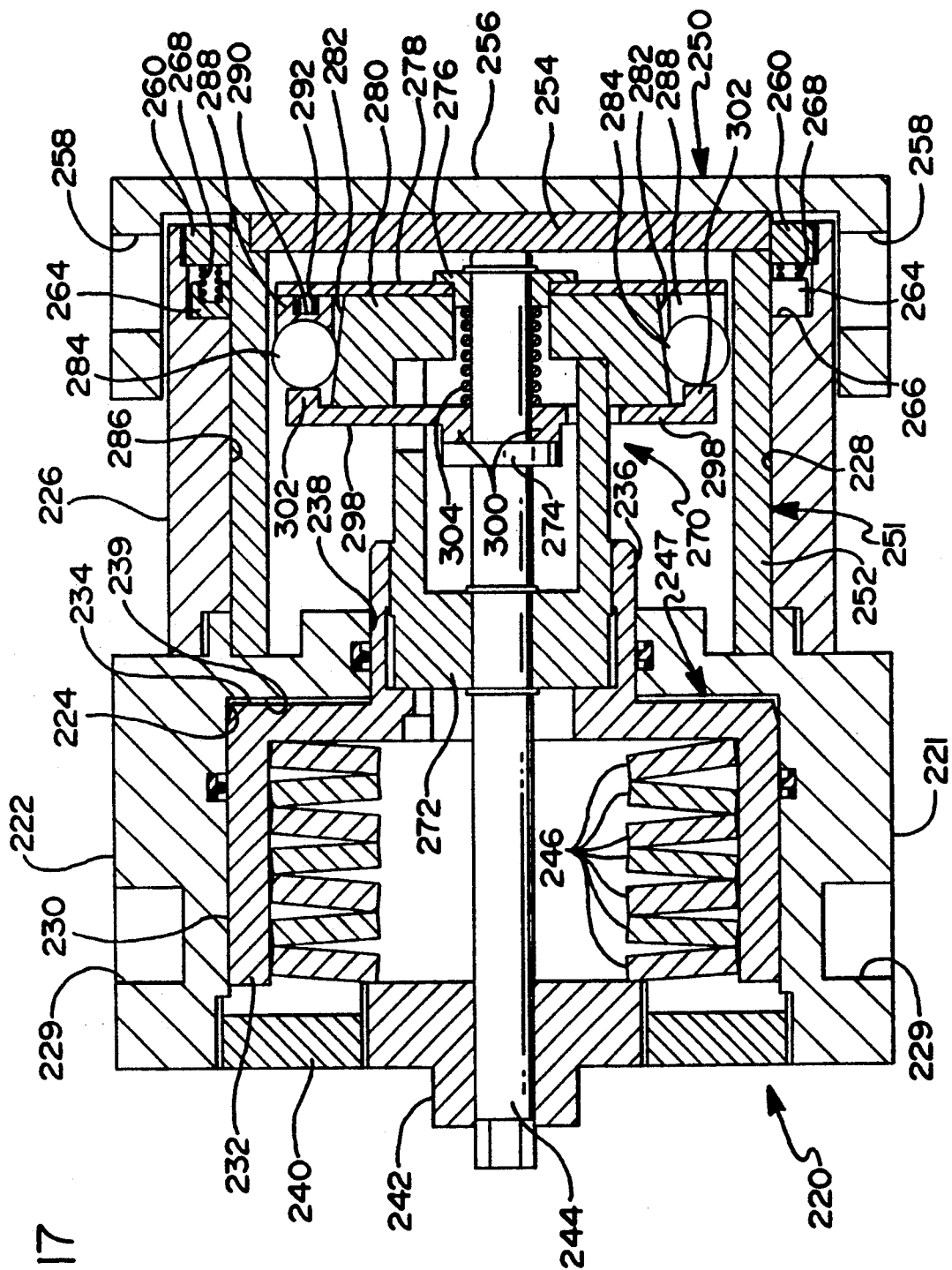
FIG. 17 is a view similar to FIG. 16, but with the actuator illustrated in a failure mode with the brakes cutout.
Figure 18:
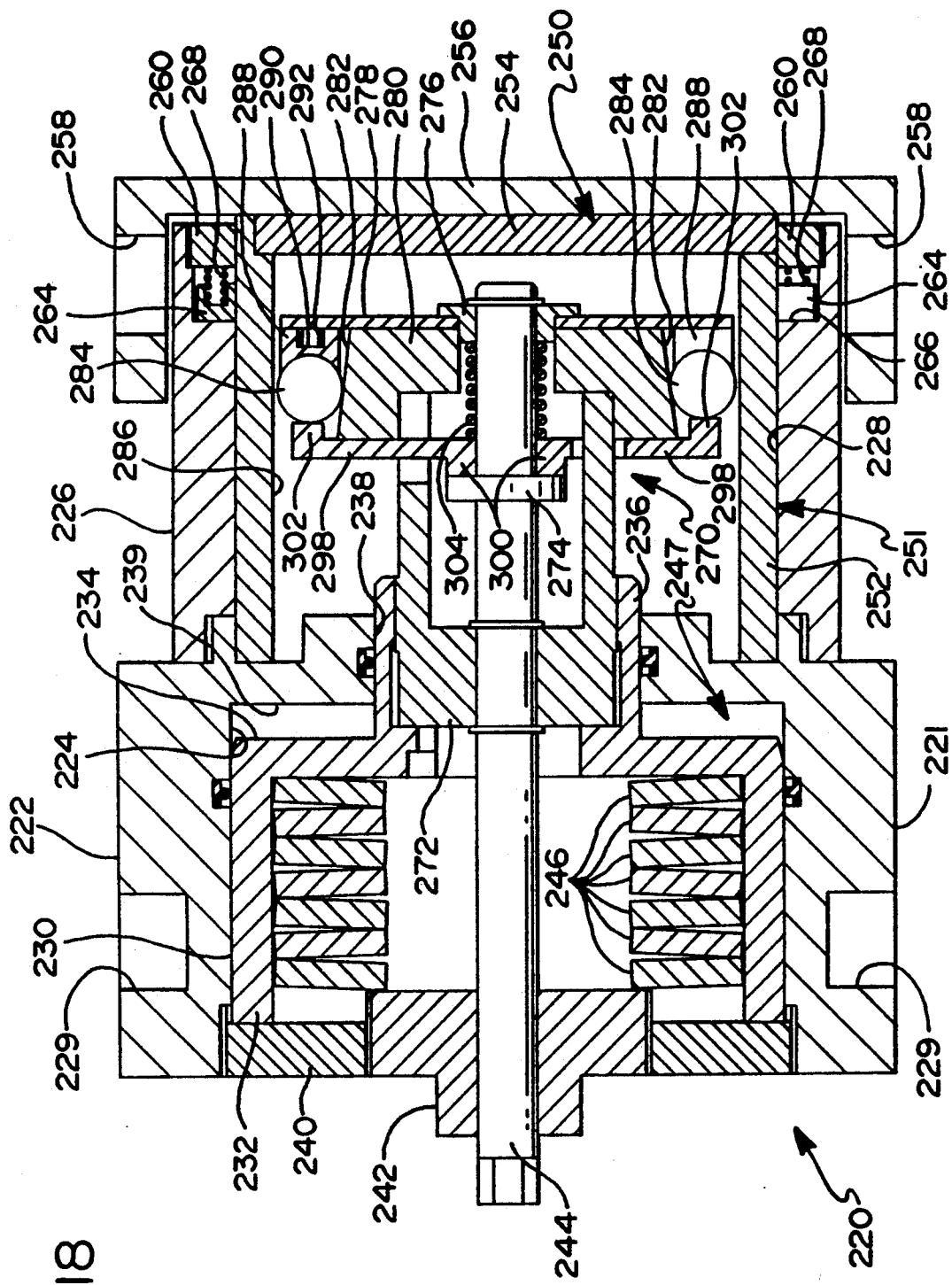
FIG. 18 is a view similar to FIG. 17, but with the actuator restored to normal operation and illustrated in brake cutout and brake released position.

Operation of actuator 220 will now be explained with reference to FIGS. 15-17. Actuator 220 is shown in its brake-released position in FIG. 15, with hydraulic pressure in chamber 247 which retracts piston 230 against the force of springs 246. Because of the one-way clutch 270, this has no effect on the positioning of piston 251. However, piston 251 is also retracted by springs 268, which retract gripper ring 264 against abutment 266. Because of the frictional attachment to ring 264, this carries piston 251 with it.

The brakes are applied by selectively reducing hydraulic pressure in chamber 247. This enables springs 246 to extend piston 230. This also extends piston 251 via one-way clutch 270 until the brake pads engage the brake disc. The force of engagement is determined by the force differential between the force of springs 246 and the countering force exerted by the hydraulic fluid in chamber 247. This force is much larger than the comparatively weak force exerted by springs 268 on gripper ring 264. Thus, as piston 251 extends, gripper ring 264 will abut seal ring 258 and stop. Piston 251 will continue to extend, if necessary, relative to ring 264 to apply the brakes. Actuator 220 is now in the FIG. 16 position. To remove braking force, chamber 247 is again pressurized to overcome the force of springs 246 and retract piston 230 into abutment with end cap 240.

Upon removal of the extension force exerted on piston 251 by piston 230, piston 251 is retracted by the force of springs 268 acting through gripper ring 264. Retracting movement of piston 251 is limited by the travel of gripper ring 264 and is independent of the retracting movement of piston 230 because of one-way clutch 270. The movement of piston 251 relative to piston 230 accommodates brake wear. The limited retracting movement of piston 251 creates brake slack and is controlled by the movement of gripper ring 264 between abutments 266 and 260.

Actuator 220 is a spring-apply, hydraulic release type of actuator and is, thus "fail safe" in that hydraulic failure causes brake application. In such an event, upon such a hydraulic malfunction or failure, it is desirable to disable or "cutout" the brakes on the car affected to enable the train to proceed to a location where the car with the failed brakes can be removed for repair. To accomplish this it is only necessary to manually rotate cutout shaft 244. This forces the ends of pin 274 up ramps 300 to force spider fingers 302 to unseat rollers 284 and thereby disable one-way clutch 270. Actuator 220 will then be as illustrated in FIG. 17, with springs 246 fully extending piston 230. With rollers 284 disengaged, springs 268 keep piston 251 retracted. Should hydraulic pressure be restored, actuator 220 will assume the FIG. 18 position.

Thus, this embodiment of the invention provides a hydraulic railway service brake actuator having an automatic brake wear compensator of less complexity than the automatic rotary device in current use and provides a slack adjuster that is simpler and does not have a catastrophic failure mode.

While only a preferred and alternative embodiments have been illustrated and described, obvious modifications thereof are contemplated within the scope of this invention and the following claims.

I claim:

1. A brake actuator for operating a railway brake, comprising
   a first output member comprising a cylinder having an operating cavity with open and closed ends,
   a second output member comprising a piston assembly extending through the open end into the cavity,
   means connecting the actuator to the brake such that extension of the piston from the cylinder applies the brake and retraction of the piston within the cylinder releases the brake,
   a gripper ring carried by one of the output members and gripping a surface of the other output member with a frictional force to enable movement therewith,
   spring means engaging the ring and exerting a retracting force on the ring and other output member which is smaller than the friction force, a first abutment on the one member limiting retraction of the ring and other member by the spring means,
   power means for extending the piston assembly with a force greater than the friction force and greater than the retracting force to apply the brake and for enabling the spring means to retract the piston assembly to release the brake,
   a second abutment on the cylinder limiting extension of the ring upon extension of the piston assembly and ring by the hydraulic force, while permitting continued movement of the piston assembly relative to the ring to apply the brake,
   whereby the limited retraction of the ring provides brake slack, and movement of the piston assembly relative to the ring upon extension compensates for brake wear.

2. The brake actuator of claim 1, including a wear adjuster comprising a one-way clutch which enables the piston to freely extend, but which limits piston retraction.

3. The brake actuator of claim 2, wherein the wear adjuster includes means for disabling the one-way clutch to enable the piston to freely retract.

4. The brake actuator of claim 3, wherein the one-way clutch comprises a tapered ramp carried by one of the output members, a rotary locking member wedged between the a surface of the other output member and the ramp, and second spring means biasing the rotary member into wedged position to prevent retraction of the piston relative to the ramp but permit its extension relative thereto, the disabling means being operable to move the rotary member out of wedged position to enable the piston to freely retract relative to the ramp.

5. The brake actuator of claim 4, wherein a plurality of ramps are carried by the one output member in circumferentially spaced relation, a rotary locking member is located between the surface of the other output member and each ramp, the second spring means is operative to bias each rotary locking member into wedged position, and the unlocking member is operable to simultaneously move all of the rotary locking members out of wedged position.

6. The brake actuator of claim 5, wherein the ramps have a wedge angle of 7°-8° and the rotary locking members are rollers.

7. The brake actuator of claim 5, wherein ramps have a wedge angle of 7°-8° and the rotary locking members are balls.

8. A brake actuator for operating a railway brake, comprising
   a cylinder having an operating cavity with open and closed ends,
   a piston assembly extending through the open end into the cavity,
   means connecting the actuator to the brake such that extension of the piston assembly from the cylinder applies the brake and retraction of the piston assembly within the cylinder releases the brake,
   a gripper ring carried by the cylinder and gripping the exterior of the piston assembly with a frictional force to enable movement therewith,
   spring means for exerting a retracting force on the ring and piston assembly which is smaller than the friction force,
   a first abutment on the cylinder limiting retraction of the ring and piston assembly by the spring means,
   power means for extending the piston assembly with a force greater than the friction force and greater than the retracting force to apply the brake and for enabling the spring means to retract the piston assembly to release the brake,
   a second abutment on the cylinder limiting extension of the ring upon extension of the piston assembly and ring by the hydraulic force, while permitting continued movement of the piston assembly relative to the ring to apply the brake,
   whereby the limited retraction of the ring provides brake slack, and movement of the piston assembly relative to the ring upon extension compensates for brake wear.

9. The brake actuator of claim 8 including a wear adjuster comprising a one-way clutch which enables the piston to freely extend, but which limits piston retraction.

10. The brake actuator of claim 9, wherein the wear adjuster includes means for disabling the one-way clutch to enable the piston to freely retract.

11. The brake actuator of claim 10, wherein the piston assembly comprises an inner piston and an outer piston movable relative thereto and engageable by the gripper ring, the one-way clutch being operable to cause the outer piston to extend with the inner piston, while enabling the inner piston to retract relative to the outer piston.

12. The brake actuator of claim 11, wherein the power means comprises second spring means engaging the inner piston for extending the piston assembly, hydraulic means for overcoming the second spring means to retract the inner piston, said first spring means being operable to retract the outer piston.

13. The brake actuator of claim 12, wherein the one-way clutch comprises a carrier member mounted on the inner piston,
   a ramp formed on the carrier member forming a tapered space between the ramp and a surface on the outer piston,
   a rotary locking member wedged in the tapered space,
   third spring means biasing the rotary locking member into wedged position to prevent retraction of the outer piston relative to the inner piston, but permit its extension relative thereto, and
   a disabling member movable relative to the carrier member to move the rotary locking member out of wedged position to disengage the outer piston from the inner piston to thereby disable the brake actuator.

14. The brake actuator of claim 13, wherein a plurality of ramps are formed on the carrier member in circumferentially spaced relation, a rotary locking member is located between the inner surface of the outer piston and each ramp, the third spring means is operative to bias each rotary locking member into wedged position, and the disabling member is operable to simultaneously move all of the rotary locking members out of wedged position.

15. The brake actuator of claim 14, wherein the ramps have a wedge angle of 7°-8° and the rotary locking members are rollers.

16. The brake actuator of claim 14, wherein ramps have a wedge angle of 7°-8° and the rotary locking members are balls.

17. The brake actuator of claim 12, wherein the cylinder includes a pair of spaced walls and the inner piston includes a flange movable between said walls by the second spring means and the hydraulic means to extend and retract the piston assembly.

18. A brake actuator for operating a railway brake, comprising
   a cylinder having a stepped operating cavity with open and closed ends,
   a piston assembly extending through the open end into the cavity,
   means connecting the actuator to the brake such that extension of the piston assembly from the cylinder applies the brake and retraction of the piston assembly within the cylinder releases the brake,
   the piston assembly comprising an outer piston slidable within one portion of the cavity, an inner piston slidable within another portion of the cavity, and a one-way clutch interconnecting the inner and outer pistons so that the outer piston extends with the inner piston, while enabling the inner piston to retract relative to the outer piston to compensate for brake wear,
   power means for extending and retracting the inner piston to apply and release the brake, and
   spring means for retracting the outer piston.

19. The brake actuator of claim 18, wherein the power means comprise second spring means for extending the inner piston and hydraulic means for retracting the inner piston.

20. The brake actuator of claim 19, wherein the cavity includes a third portion defined by spaced front and rear walls, and the inner piston includes a flange slidable between the walls, the second spring means biasing the inner piston toward the forward wall to extend the inner piston, and the hydraulic means including a source of pressure fluid selectively connectable to the third chamber portion between the forward wall and the flange and operable to overcome the second spring means to retract the inner piston.

21. The brake actuator of claim 20, including a gripper ring carried by the cylinder and gripping the exterior of the outer piston with a frictional force to enable movement therewith,
   third spring means for exerting a retracting force on the ring and outer piston which is smaller than the friction force,
   a first abutment on the cylinder limiting retraction of the ring and outer piston by the third spring means,
   the second spring means being operable to extend the inner and outer pistons with a force greater than the friction force to apply the brake,
   a second abutment on the cylinder limiting extension of the ring upon extension of the outer piston and ring, while permitting continued movement of the outer piston relative to the ring to apply the brake,
   whereby the limited retraction of the ring provides brake slack, and movement of the inner piston relative to the outer piston upon retraction compensates for brake wear.

22. The brake actuator of claim 21, wherein the one-way clutch comprises a carrier member mounted on the inner piston,
   a ramp formed on the carrier member and tapered inwardly toward the direction of piston extension,
   a rotary locking member wedged between an inner surface on the outer piston and the ramp,
   third spring means biasing the rotary locking member into wedged position to cause extension of the outer piston with the inner piston while enabling retraction of the inner member relative to the outer piston, and
   a disabling member movable relative to the carrier member to move the rotary locking member out of wedged position to prevent extension of the outer piston with the inner piston to thereby disable the brake actuator.

23. The brake actuator of claim 22, wherein a plurality of ramps are formed on the carrier member in circumferentially spaced relation, a rotary locking member is located between the inner surface of the outer piston and each ramp, the third spring means is operative to bias each rotary locking member into wedged position, and the disabling member is operable to simultaneously move all of the rotary locking members out of wedged position.

24. The brake actuator of claim 23, wherein the ramps have a wedge angle of 7°-8° and the rotary locking members are rollers.

25. The brake actuator of claim 23, wherein the rotary locking members are rollers contoured to match the piston inner cylindrical surface, the ramps are circumferentially-spaced and contoured to match the roller contour, and the third spring means comprise a reaction ring mounted on the carrier member, a retainer of anti-friction material engaging each roller, and a compression spring confined between each retainer and the reaction ring.

* * * * *